Dec. 14, 1965 A. C. PETERSON 3,223,355
ALTERNATIVE SUSTENTATION SYSTEM FOR AIRCRAFT
Filed April 1, 1963 4 Sheets-Sheet 4

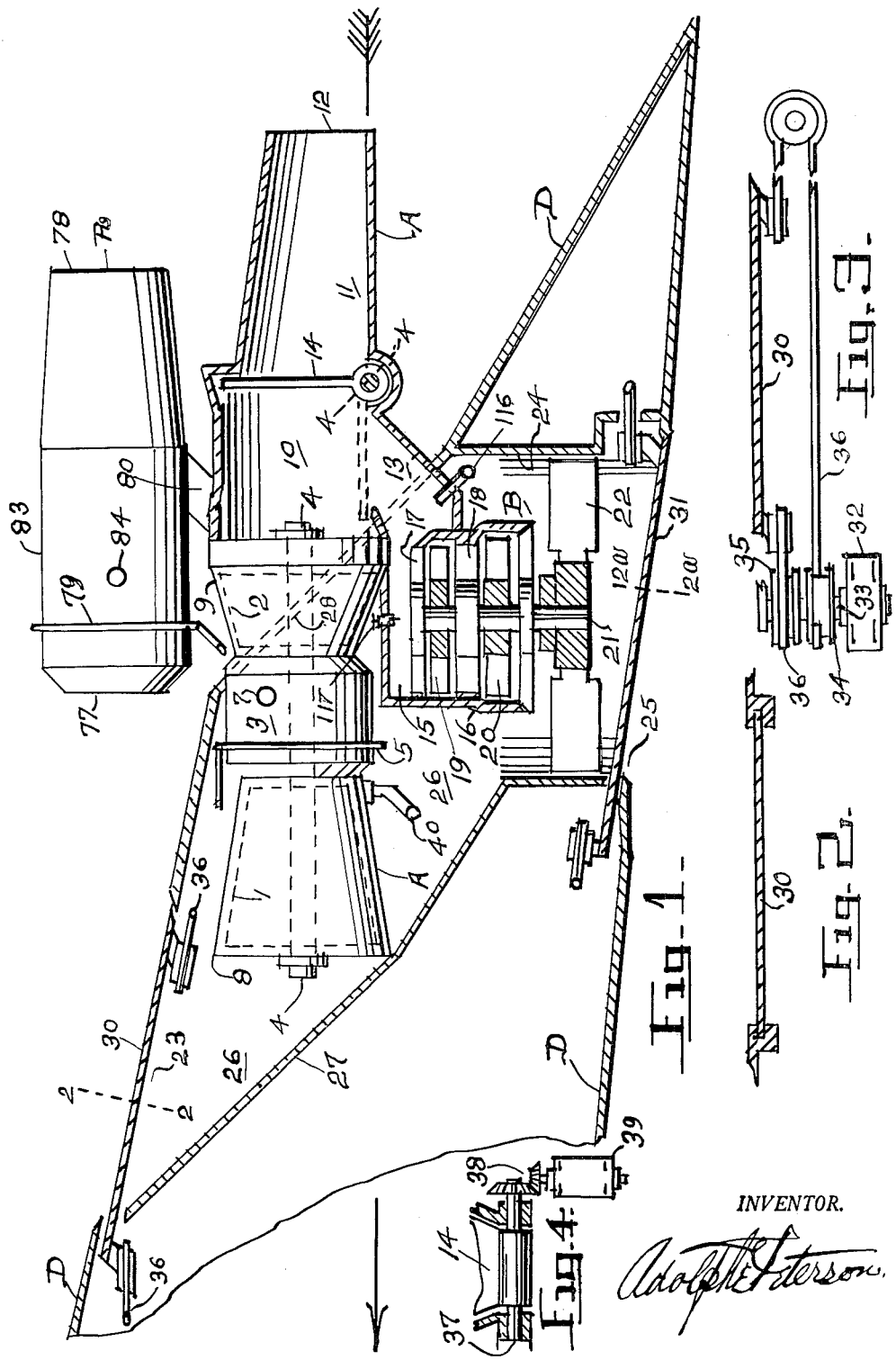

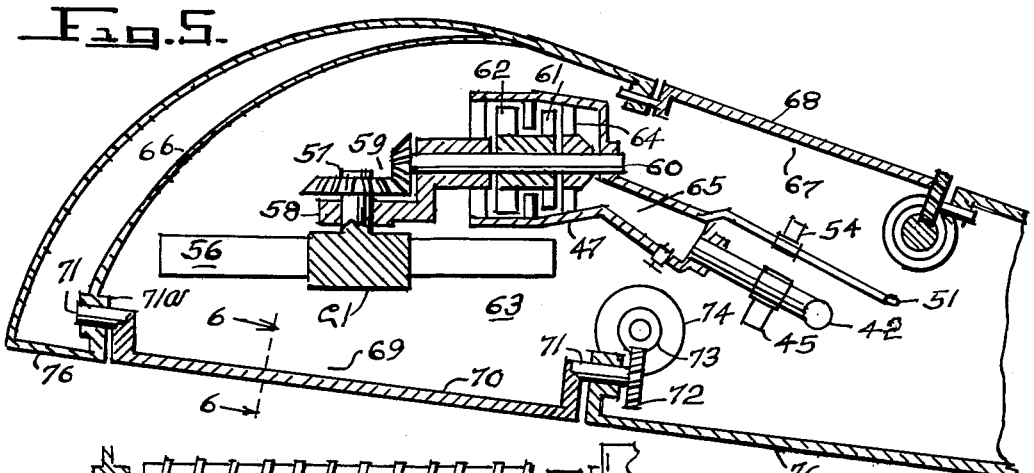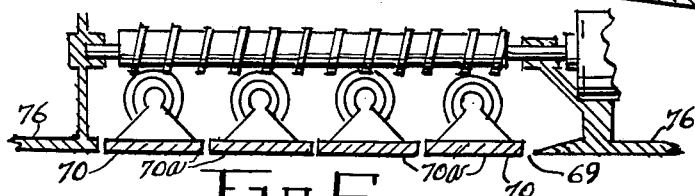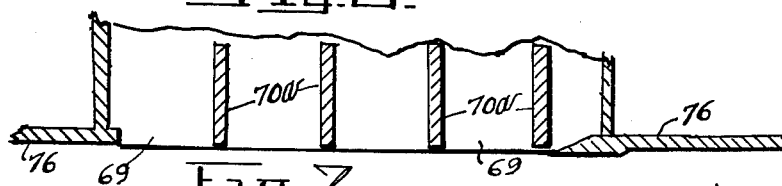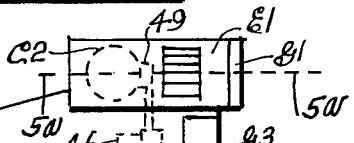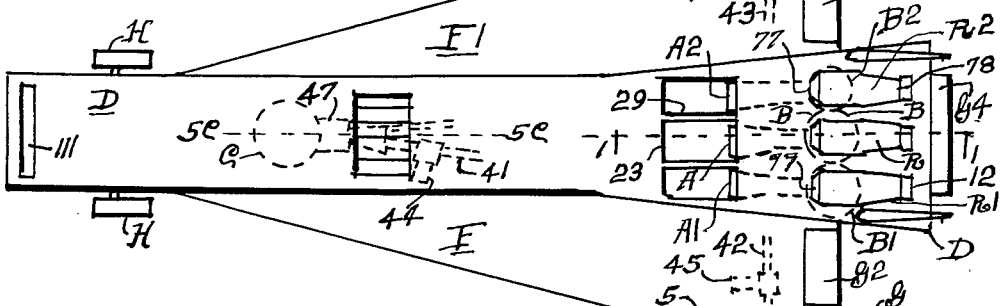

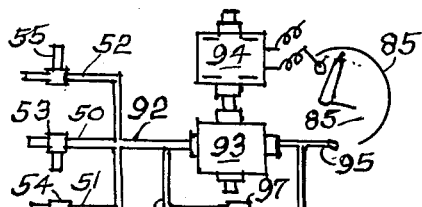
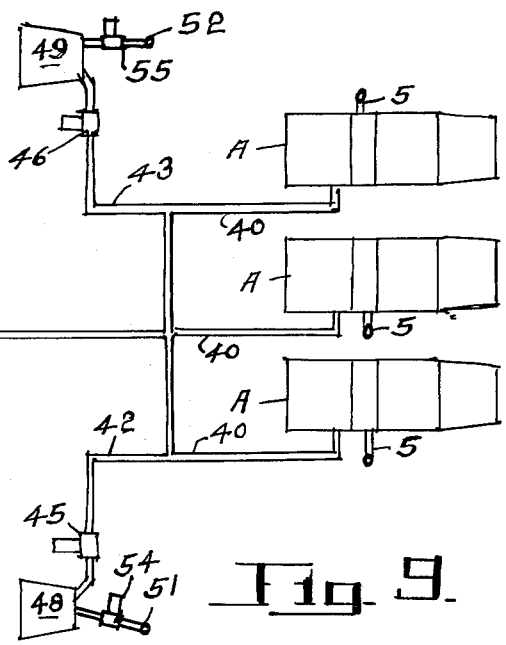
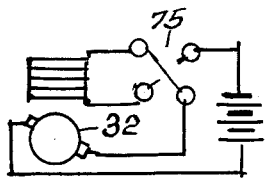
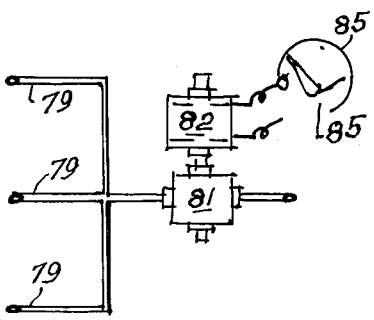
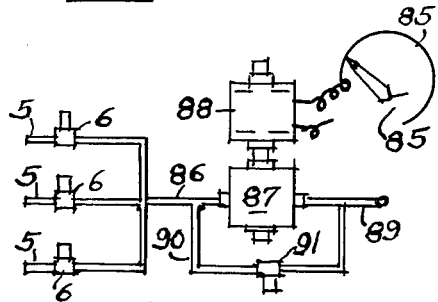

INVENTOR.

United States Patent Office 3,223,355
Patented Dec. 14, 1965

3,223,355
ALTERNATIVE SUSTENTATION SYSTEM
FOR AIRCRAFT
Adolphe C. Peterson, 4623 Bruce Ave. S.,
Minneapolis, Minn.
Filed Apr. 1, 1963, Ser. No. 269,288
4 Claims. (Cl. 244—12)

My invention relates to aircraft in general and more especially to a means providing alternative forms of sustentation for the aircraft and it is therefore designated and entitled as Alternative Sustentation System for Aircraft.

Aircraft have now been proposed and projected for use at very high flight speeds and for flight even at super-sonic speeds, and such speeds while possible of attainment result in difficulty of landing especially at such airports as are not specifically designed for super-sonic speed aircraft. The need for safety in landing and take-off of such aircraft also renders it desirable that such aircraft be so designed that they may have alternative methods of sustentation, so that greater safety is possible in use of such aircraft, and also so that aircraft may have the ability for landing and take-off at a greater variety of airport fields or locations. A principal object of my invention is the provision of a system of sustentation for an aircraft which has alternative methods of sustentation so that the objectives as above set out may be more easily obtained in aircraft of very high speeds. It is especially an object that such objectives may be obtained with less expenditure of time and capital in the design of such aircraft and in the manufacture of such aircraft. Such aircraft have been proposed in forms and design which may have the disadvantage of high cost in initial design and also in manufacture, and which in their design impose difficulties which render such designs extremely expensive in design and manufacture. An objective in this invention is the provision of a system of alternative sustentation which to a considerable extent will eliminate considerable expense and difficulty in both design and manufacture, while at the same time providing the means to overcome some of the difficulties to be encountered and providing a system which is probably more reliable in use and maintenance.

In general the objective in this invention is the improvement in design and operation of aircraft which are especially adapted for very high speed flight. The principal elements and combinations of elements and units comprising my invention are as hereinafter described and as more particularly defined in the claims. The accompanying drawings which illustrate my invention, some elements of the invention being illustrated also in a modified form, are as hereinafter described, like characters designating like parts in the forms of the invention, in so far as is practicable. Referring to the drawings:

FIGURES 1, 2, 3, 4, 9, 10, 11, 12, 13, show one form of my invention, and diagrammatic designs or illustrations of fuel flows and also air or gas flows for this form of the device, while FIGURES 5, 6, 7 show another form of the thrust or propulsion control means, and FIGURE 8 shows in diagrammatic illustration, the application of both of the forms for different locations or functions in an aircraft especially designed in form for application of these devices. FIGURE 1 is a vertical section through the rear or propulsion end of the body or fuselage of the aircraft embodying the invention, the forward end and major part of the body or fuselage being broken away in the illustration, the section being on the line 1—1 of FIGURE 8 through one propulsion unit the turbine being shown principally in side elevation, this view including one so-called thrust control means.

FIGURE 2 is a detail sectional view of a thrust control means or shutter means on the line 2—2 of FIGURE 1.

A similar section on line 2a—2a of FIGURE 1 would show in substantially like form the other shutter means of the same unit.

FIGURE 3 is also a detail illustration of the operating motor means which is operative on either of the shutter means shown in FIGURE 1, each having such an operating motor means.

FIGURE 4 is a detail section on the line 4—4 of FIGURE 1 illustrating the motor actuation means for the shutter or gate valve controlling turbine jet propulsion horizontally and vertically.

FIGURE 5 is a section vertically on the line 5—5 of FIGURE 8 and illustrating a modified supplemental turbine drive and vertical air propulsion and modified form of thrust shutter control means. FIGURE 5 also illustrates a section on the line 5a—5a of FIGURE 8, there being another such unit as in FIGURE 5, at the location of line 5a—5a of FIGURE 8. The unit on which the line 5c—5c of FIGURE 8 appears is also a unit similar to that as shown in FIGURE 5 as to supplemental turbine drive and air propulsion means, the containing body or fuselage construction being different than the wing construction as in FIGURE 5.

FIGURE 6 shows a section on the line 6—6 of FIGURE 5, this being a detail illustration of a shutter means of the modified form in section, and a side elevation in the back ground of the operating or motor actuation means for the shutter means there shown.

FIGURE 7 is another section on a similar line 6—6 of FIGURE 5, but showing the shutter means in the open condition, and without showing of the operating means, or motor means for the shutter means.

FIGURE 8 is a diagrammatic plan view of an aircraft having mounted therein three main turbine jet propulsion units, two supplemental turbine and air propulsion units for vertical sustentation and stabilizing, one forwardly mounted supplemental turbine drive and air propulsion vertically for longitudinal stabilization of the aircraft, as well as sustentation, vertically; and shows three ram-jet units.

FIGURE 9 diagrammatically shows air supply and control therefor to three supplemental driving turbines and pressurized air supply from the main propulsion turbines.

FIGURE 10 shows fuel supply to main turbines.

FIGURE 11 shows fuel supply to ram-jets.

FIGURE 12 shows fuel supply to three supplemental turbines for driving vertical air propulsion means.

FIGURE 13 shows reversing motor drive and control means for either one of the shutter means, there being upper and lower shutter means and motor actuation means at each vertical air propulsion location; all of these figures being only diagrammatic in character.

Figure 14:
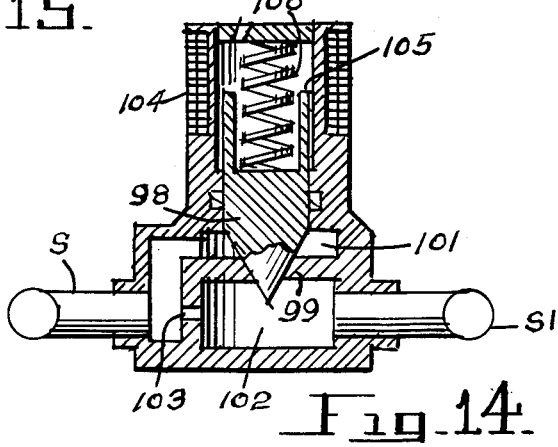

FIGURE 14 shows construction of valve units.

Figure 15:
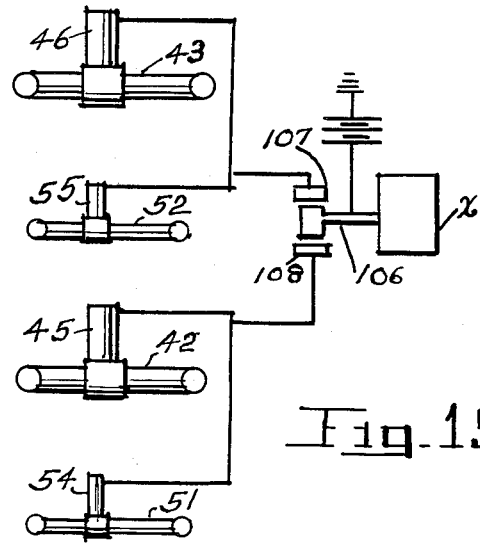
Figure 16:
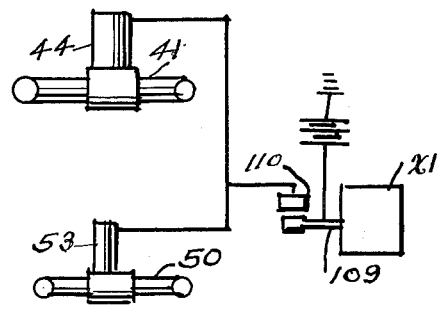

FIGURES 15, 16 show control for stabilizing means.

Figure 17:
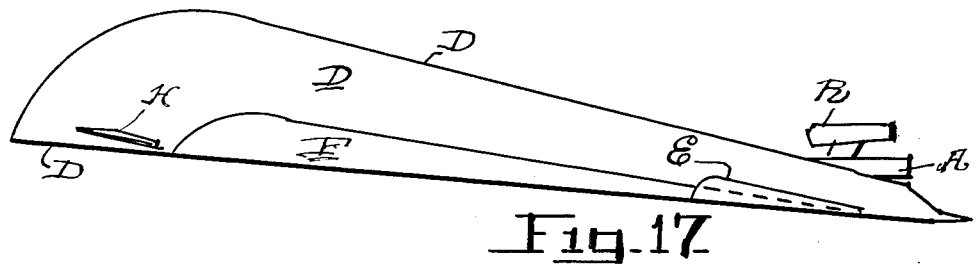
Figure 18:
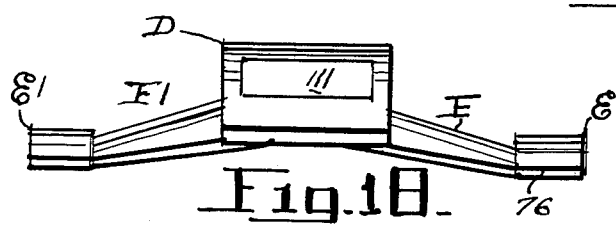

FIGURES 17, 18 show side elevation and front views of aircraft embodying the means on reduced scale.

Figure 19:
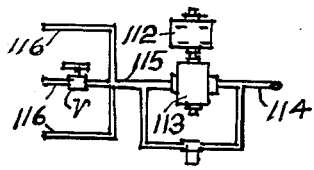

FIGURE 19 shows fuel supply to supplemental or satellite turbines, each driving an air fan 22.

The aircraft involving this invention shows several propulsion units, some of one type, some of another type, some of which are both translational propulsion means and also sustentation propulsion means. These propulsion units are individually designated as turbine-generator propulsion units A, A1, A2; sustentation propulsion units B, B1, B2; sustentation-stabilizing units C, C1, C2. The units A, A1, A2, and B, B1, B2, and the unit C are all mounted in and supported in what is designated a fuselage wing section generally designated D the latter being shaped in vertical section somewhat similar to an airfoil wing so that it can contribute sustentation in translational flight at high speed, being deeper in vertical section at the front end and shallower (narrower) in vertical section at and towards the rear end, and being in transverse vertical section substantially as a rectangle at any location from front to rear except at the extreme front end where it in vertical section diminishes in vertical size to form a leading edge wing shaped.

The units C1, C2, are formed one in a some-what enlarged lateral airfoil wing section E and the other in a similarly enlarged lateral airfoil wing section E1. The aircraft in which the propulsion units are mounted has also the two lateral wing sections F and F1 these forming generally a Delta wing shaped airfoil one part being on one lateral side of the fuselage wing section and the other part being on the other lateral side of the fuselage wing section D. The aircraft so formed by the wing sections as described has horizontal stabilizing ailerons G, G1, sustentation flaps G2, G3. The aircraft also may have the forward control ailerons H, H1. All of such ailerons and control ailerons are provided for stabilizing control and also some supplemental sustentation in normal translation flight.

Each unit A, A1, A2 is in sustentation association with one of the B, B1, B2 and each so-called combination is associated with its individual so-called air-well formed in the fuselage wing section D and each has associated with it its air-well shutters and its air and fuel control means as hereinafter described. Each of the sustentation-stabilizing units C, C1, C2, is associated with its individual air-well formed in the fuselage or wing sections wherein it is mounted and has its individual control means by shutters and other individual control means as hereinafter described.

For the purpose of description of propulsion units of the type A, A1, A2 and associated units B, B1, B2, reference is now made to the one unit which is shown in vertical section in FIGURE 1, this section being of the unit on the line 1—1 of FIGURE 8. The unit as designated has a combustion gas turbine having compressor rotor 1, turbine rotor 2, combustion section 3, turbine shaft 4 mounting and mechanically connecting compressor rotor 1 and turbine rotor 2, fuel line ring 5, fuel control means 6, ignition plug 7. The said rotors and shaft are shown only diagrammatically by dotted lines within the casings 8 and 9. The unit has also the exhaust gas chamber 10 to which the turbine exhausts gases, the jet propulsion nozzle or tube 11 discharging at 12 to atmosphere rearwardly, and the alternative discharge passage 13 discharging from the turbine chamber 10, this discharge being alternatively as directed or controlled by the exhaust gate valve 14.

The alternative discharge passage 13 may have discharge to the inlet chamber 15 of the associated sustentation-propulsion unit B and gases would then pass through the turbine casing 16 as directed by guide or nozzle blades 17 and 18 and drive the turbine rotor blades 19 and 20 and thereby drive the shaft 21 and the air-fan or as otherwise called air-propellor 22. The air-fan 22, when so driven (in the one condition of the exhaust gate valve 14) will draw and propel air from atmosphere through the upper air port 23 and downward through the cylindrical fan passage 24 and discharge the air so propelled at the discharge port 25 which is downwardly directed from the underside of the fuselage wing section D, this air-propulsion being such, however, only when the turbine unit A is functioning and when the air passage as formed is open at both its upper air port 23 and its discharge port 25, the shutter means as hereinafter described being in the open or withdrawn positions.

The air-well or passage as described above is generally designated as 26 and it is bounded by the walls 27 and 28 and the vertical division walls 29 (FIGURE 8). The upper air port 23 and the discharge port 25 are controlled by the shutters 30 and 31, respectively, each of these being large enough in length and width to perform the function described and each at its two lateral edges being slidable and positioned by the tracks associated with it, one such track and edge assembly being shown in FIGURE 2, that figure being illustrative of the form of mounting and slidable functioning for each of the two shutters associated with the air-well 26 and its ports 23 and 25. Each of the shutters 30 and 31 has an actuating means as illustrated in FIGURE 3, wherein there is shown an electric motor 32 which may rotate shaft 33 and pulleys or sprockets 34, 35, one winding the cable or sprocket chain 36 and the other unwinding that element. Either a cable or sprocket chain may be used as the element 36 and its function is to pull the associated shutter 30 or 31 in one direction or the other, forwardly or rearwardly, to open or close the air-well and top or bottom of the air well 26.

The exhaust gate-valve 14 is mounted at its bottom edge on a valve shaft 37 and turns with the latter and the shaft 37 may be rotated in either direction through approximately ninety degrees of rotation by means of the bevel gears 38 and the electric control motor 39, the gear reduction and form being such as is may be necessary in any particular construction to secure the proper functioning. In one position the exhaust gate valve 14 will close the discharge jet which is for forward propulsion and will open the exhaust discharge to the sustentation propulsion turbine so that the air fan is given high speed rotation, and in the alternative position the valve 14 will open the discharge jet for forward propulsion and will close the discharge to the sustentation propulsion turbine driving the air fan, thus in one position procuring air propulsion downwardly through the air fan and air well 26 and air discharge downwardly, and in the opposite position procuring gas flow through the discharge jet for forward translational propulsion. It will be understood that for either of these propulsion conditions, the upper air port will be open, and that for vertical sustentation, both the upper and lower air ports will be open.

The compressor rotor of the unit A may provide pressurized air for the sustentation-stabilizing units C, C1, C2, by means of the pressurized air discharge pipe 40 (FIGS. 1, 9, 5). The pipe 40 may deliver pressurized air to either of pipes 41, 42, 43, and thereby as controlled by valve units 44, 45, 46, (electric actuable valves) to the turbines 47, 48, 49, of the sustentation-stabilizing units C, C1, or C2. Each of the latter may receive fuel for combustion by means of the fuel lines 50, 51, 52 (FIG. 12) as controlled by valve units 53, 54, 55 (FIG. 12).

The sustentation-stabilizing unit C is shown in FIGURE 5, wherein the unit is shown as mounted in and formed in the fuselage wing section on line 5a—5a FIGURE 8.

The unit C1 will be described in detail now and it should now be understood that each of the sustentation units C1 and C2 is in general similar to that described as unit C1, there being, however, a difference in the aircraft sections or units wherein such units are mounted, C being in the fuselage wing section and C1 and C2 being each in a lateral airfoil wing section.

The unit C1 is composed of an air fan (air propeller) 56 which is fixed on shaft 57 the latter being rotatable in bearing 58, and this air fan is or may be driven by the bevel gears 59, the latter in turn being driven by the turbine shaft 60 and the latter's blade rotors 61, 62. The rotors of the turbine operate in the turbine casing 47 and guide blades 64 which are stator blades direct the combustion gases to the rotor blades as the gases emerge from a combustion chamber 65, the latter being supplied with pressurized air from the pipe 41 and being supplied with fuel by the fuel pipe 51 as controlled by the associated valve units 45 and 54 respectively. The unit C1 is within an air well which is designated 63 and is defined in part by the wall 66 and in part by the adjacent walls of the lateral airfoil wing section, and this air well has on the upper side of the wing section an air port 67 for air entry when shutter 68 is removed from the port, and has an air discharge port 69 for air discharge when shutter 70 is removed from the port. It will be noted that shutter 70 when in place as shown by FIGURE 5 will form substantially a continuation of the under plane side of the wing section in which the unit is mounted and that thus this shutter is substantially in the same plane inclined to the horizontal or translational flight direction in flight.

The description of the unit C1 may be understood to be also as a similar description of each of the units C and C2, each thereof being mounted in its associated air well with associated air entry port and air discharge port. The turbines of units C1 and C2 have been designated above as 48, and 49.

The shutters 68 and 70 and the like shutters of the units C1 and C2 are of the form as shown in FIGURES 6 and 7, and description of the one shutter, FIG. 6 being a section on the line 6—6 of FIGURE 5 will likewise describe each of the other shutters of units C1, C2 and the upper shutter of unit C. Each shutter and that as shown in FIGURES 5, 6, and 7 is composed of a plural number of shutter sections, each in FIGURE 6 designated at 70a, and each being mounted on a pair of pivot pins 71 each oscillative in bearing means 71a each having a worm wheel 72 on one pivot pin and by which it may be oscillative by actuation by the worm 73 which is in turn rotated in either direction by means of the electric motor 74 the latter being controlled by an electric reversing switch 75 as such reversing motors are generally known to be reversible. The reversible operation of the electric motor procures stationing of the sections 70a in the plane of the underside wall 76 of the wing section or fuselage wing section and alternatively, the stationing of the sections 70a in the right-angled position as in FIGURE 7. In the former position the shutter sections 70a form part of the air foil plane surface of the wing section, and in the latter alternative position the wing shutter sections do not close the air port to or from the air well of the unit C1 as they are placed in the plane of the direction of flow of air from the air well, or to the air well in the case of the shutter 68. Each unit C1 and C2 has a controlling electric motor such as that illustrated in FIGURES 5 and 6 as motor 74.

The turbine units A, A1, A2 are operative to propel the aircraft in the lower ranges of speed in flight of the aircraft, and that may in some constructions be the normal flight speed, but the aircraft as shown in FIGURES 1 and 8 has an additional propulsion means for its highest flight speed, and such means are provided by the three ram-jets designated as R, R1, R2, each of which is operative as a ram-jet, having air intake at 77 and jet discharge at 78 and fuel delivery by a fuel line 79. Each ram-jet is mounted on the air craft by brackets 80. The fuel is supplied to the fuel lines 79, there being one to each ram-jet, and these are supplied with fuel under pressure by the fuel pump 81, the latter being driven by electric motor 82, such motor being of a variable speed type to provide for variation and control of the fuel usage by the ram-jets. Such ram-jets have the general form of the combustion chamber 83 as in ram jets as well known and each has ignition means 84. These ram-jets are contemplated to be operative at highest speeds when the turbine propulsion means is not operative, although it is contemplated also that the propulsion means may be so proportioned that both the turbine jet means and the ram jet means may be used in highest speed flight, of a particular aircraft construction.

There is shown in FIGURES 10, 11 and 12, a form of rheostat control for the electric motors, this rheostat control designated 85 being of any type such as is well known and such as may be operative by manual control or otherwise to procure variable speed of the motor 82 and thereby variable supply of fuel per unit of time to the ram-jets R, R1, R2. Each of the main propulsion turbines A has supply of fuel to its combustion chamber by a pipe as previously designated as 5 and each of these fuel supply pipes 5 is connected by a main fuel pipe 86 to the delivery from a fuel pump 87 and the latter is driven by an electric motor 88 and is a variable fuel delivery pump and is supplied by the pipe 89 which receives fuel from any reservoir means (not shown) and such delivery of fuel is variable by means of any rheostat means such as that shown in FIGURE 19 which should be regarded also as disclosure of such rheostat control means for the electric motor 88. A by-pass 90 controlled by a safety valve 91 provides for prevention of any fuel pressure over that pressure which may be regarded as the maximum pressure in use. The sustentation-stabilizing units C, C1, C2 are supplied individually by the fuel pipes 50, 51, 52, respectively, and these receive fuel from the main pipe 92 and the latter is supplied by fuel pump 93 as that is driven by the variable speed electric motor 94, the pump receiving fuel by supply pipe 95 and the fuel pressure is controlled by a safety valve 97 which may when maximum operating pressure is exceeded open by-pass pipe 96. The variable speed of the motor 94 is obtained by a rheostat electric control means such as that shown in FIGURE 19, and this should be considered as a part of the control means for the electric motor 94 to procure the variable fuel delivery to the sustentation-stabilizing turbines of units C, C1, C2, if such variable motor speed is deemed necessary in any particular construction, it being noted that such variable speed of motor 94 is not necessary except for a general control of power output. Each of the valves 53, 54, 55 is controlled as hereinafter described in connection with FIGURES 14, 15, 16, to secure the stabilizing action which is a chief function of units C, C1, C2.

Referring now to FIGURES 14, 15, 16, FIGURE 14 is illustration of the particular construction of each of the fuel control valves 53, 54, 55, and also of each of the air pressure flow control valves 44, 45, 46. Each such control valve (fuel and also air) (see FIG. 14) has a flow valve 98 controlling a main flow aperture 99 and is normally held seated to prevent flow through aperture 99 by a coil spring 100. The main flow will be through the main flow aperture 99 from supply pipe S (to designate one of the control valves) through chamber 101 to chamber 102 to pipe S1 (designating thus any control valve discharge pipe), and there is also a minor or small flow from supply pipe S to chamber 102 to pipe S1 by means of a relatively smaller aperture 103. The result of this flow control in each of the control valve units 53, 54, 55, and also 44, 45, 46, is that there is at all times a relatively small flow of air and fuel for combustion in each of the turbines of sustentation-stabilizing units C, C1, C2, but that flow of both air and fuel to any selected one of the units C, C1, C2, may be largely increased (and power increased) by opening any selected one of the fuel valves and an associated one of the air flow valves. This selection control to increase power and sustentation effect is accomplished by the electric current control means as shown in FIGURES 15 and 16, and effect of current flow in any selected one of the solenoids 104, each valve unit having such a solenoid which is effective to cause electro-magnetic attraction upon the armature 105 of the selected valve unit. In FIGURE 15 a gyro-control unit X (this being of any well known gyro control means) moves gyro arm 106 to contact either contact 107 or 108 or to place it intermediately in position to make no contact. When either contact 107 or 108 is contacted current flows to the selected solenoid of either unit 45 or 46 and simultaneously also to the selected solenoid of either unit 54 or 55 which is associated, so that thereupon (on contact) the associated selected sustentation-stabilizing unit C1 or C2 receives a much larger flow of both air and fuel to its turbine 48 or 49, and this gives much additional power and speed to the associated air-fan or air-propeller, such as is illustrated by air-fan 56 in unit C1, each unit C, C1, C2 having one such air-fan. The gyro unit X provides stabilizing control for units C1 and C2 according to the need for lateral stabilization of the air-craft, there being thus a higher rotative speed given to the selected air-fan of a stabilization unit C1 or C2.

FIGURE 16 shows similar control by gyro-unit X1, its arm 109 and contact 110 providing current flow to air control valve 44 and associated fuel control valve 53, so that its solenoid by its armature opens its main flow aperture, this occurring in both air and fuel valves of the unit C, which provides longitudinal stabilization for the aircraft by increasing power and speed of the associated air-fan, that is that of the unit C.

Having described the detail construction of units and elements constituting the invention, the general operation and control of an aircraft embodying the invention and its units is now more generally described. It is assumed that the aircraft has such fuel reservoirs and also such electric battery means or other means as are necessary for the control system and for the ignition system which will provide ignition for the various units needing such ignition means.

Assuming that the aircraft is on the ground or air port field, of such other landing place such as an aircraft carrier, the pilot, who may occupy the cabin at the front end of the unit D which may have observation window at 111 (FIGURE 8), will first place each of the exhaust gate valves 14 (there being three, one for each unit A, A1, A2) in the position alternative to that shown by dotted lines and which is indicated by the dotted lines 14 in FIGURE 1, and he will then start each of the units A, A1, A2, in operation using such starting means as are well known and which it is contemplated is supplied with each unit A, A1, A2, and having started the units, will adjust each to operate at an idling speed. Prior to such starting he will have opened the ports 23 and 25, so that atmospheric air may be drawn into the compressors of the turbine units designated through ports 23, three in number. He now controls the shutter actuating means by means of reversing switches 75 associated, so that shutter means 68 and 70 of each unit C, C1, C2 are in the open positions so that air may flow in air-wells 63, and he then controls the turbine units 47, 48, 49 of units C, C1, C2, so that air may flow to them under pressure from the main turbine compressors and so that fuel may flow, it being understood that at this time each of the valve units for fuel and air to such turbine units is in such position that flow is only at the low range volume. At this time he will make certain that all the shutter elements are in the open position to turbine units so that there may be air flow through each of the air wells 26 and also each air well 63, one for each unit C, C1, C2.

To procure take-off of the aircraft, the pilot now places all of the three exhaust gate valves 14 in positions such as that shown by the solid lines 14 in FIGURE 1, and he then immediately increases the power output of each of the three units A, A1, A2, by their main power turbines 2 and also initiates fuel flow by the fuel pump unit shown in FIGURE 19, which diagrammatically shows the fuel supply to the inlet chambers 15 of each unit B, B1, B2. This fuel supply (FIGURE 19) has the electric motor 112, fuel pump 113 driven by the motor 112, fuel supply pipe 114, fuel pump discharge 115, the latter delivering to each individual fuel pipe 116 and thereby to the associated inlet chamber 15 for combustion with some of the excess air flowing from main turbines A, A1, A2, there being excess air as is customary in gas turbines. Ignition may be procured by residual flame from main turbines or in addition there may be spark plugs 117 one for each inlet chamber 15. It is contemplated that fuel supplied by fuel pump 113 may be only such as may safely be used in the three turbines 16, and that the pilot or any automatic means will control such fuel supply. Valve V may close one pipe 116.

Having increased fuel supply to main units A, A1, A2, and supplying fuel as may be necessary to inlet chambers 15 of such units, the three air-fans designated as 22 in FIGURE 1 (one 22 for each unit B, B1, and B2), the electric control means for the solenoid actuated valves of units C, C1, C2, will now perform automatically, each supplying and controlling air and fuel flow, when needed above the smaller minimum flows. The three air-fans 22 draw a large volume of ambient air from above the aircraft and force this air flow downwardly through the three air wells 26 and that flow and thrust procured by the flow of such air from ambient air and also exhaust gases from turbines 16 will contribute such upward thrust upon the aircraft fuselage wing section D and the extreme lateral sections of members F and F1 as will procure vertically upward movement of the aircraft, that is take-off of the aircraft. If it be desired, in such locations as ground conditions or airport condition will permit, the pilot may place the gate valve 14 of one unit A, A1, or A2 in the position shown by dotted lines, at take-off time, so that then there may be such forward propulsion of the aircraft as will assist upward movement of the aircraft in take-off, or to secure the same end each gate valve 14 may be placed in a position whereby there is partial exhaust through the jet outlet 12 and partial exhaust through the turbines 16 of units B, B1, B2.

In take-off of the aircraft, the gyro units X and X1 automatically perform with such effect that when the extreme front end of the aircraft, unit D, dips downward slightly as compared with the opposite end of the unit D, the valve means 53–44 will increase air and fuel flow to unit C (associated turbine 47) and its air-fan 56 is then driven at much higher speed to procure increased upward thrust at that location by flow through air well 63 associated, and that increased thrust will continue as long as necessary for such stabilization and flow will then be caused by the electric control to diminish again, such alternate action being continuously determined as may be necessary. At the same time, the control by gyro-unit X will control flow similarly to turbines 48, 49 of units C1, C2, according to the stabilizing need as determined by gyro-unit X, turbine power and air flow increasing in either unit C1 or C2 if at the location of the unit C1 or C2, there is relative lower position than at the other unit C1 or C2, but each unit produces some sustentation.

Having procured such elevation as deemed sufficient, for translational travel, the pilot then discontinues fuel flow to inlet chambers 15 of units B, B1, B2, and opens gate valves 14 placing them all in positions such as shown by dotted line 14 (FIG. 1) and he then also by the controls provided causes all shutters 68 and 70 of units C, C1, C2, to be closed, and also causes shutter 31 (the lower) of each unit B, B1, B2, to be closed, whereupon all air flow for propulsion is from the three air ports 23 of the three units A, A1, A2, through the units A, etc., through their combustion chambers and turbines 2 (three), and through jet outlets 12 (three) to ambient air rearwardly, thus procuring high forward thrust for forward propulsion. Travel speed will then greatly increase. Aircraft control will then be by the usual travel control means, members G2, G3, G, G1, members H, and member G4 (FIGURE 8) all such control being as commonly used in aircraft. It is contemplated, however, that the stabilizing control may be by the units C, C1, C2, in all translational travel as well as in take-off, hovering and landing situations.

Assume now that the pilot desires the highest speed, and that the aircraft is equipped with the ram-jet units R, R1, R2, as described, the pilot may then by motor 82 and ignition elements 84, procure fuel flow to the combustion chambers of units R, R1, R2 and ignition with air flowing through such ram-jet from their air intakes 77 (one for each unit), and ram-jet propulsion will then commence, with propulsion at the highest contemplated speed. When landing, on air-port or carrier, is desired, the shutters to the air wells are all removed from their closed position so that there is air flow through the air wells, and the gate valves 14, when propulsion has been slowed by reduction of fuel flow, may then be moved to positions to close exhaust by jet outlets 12 (or by one or more thereof) and fuel flow to chambers 15 is initiated, and also to units C, C1, C2, so that then there is sustentation by the air-fans 22 (three) and air-fans 56 (three) and control of power and air flow in the air wells by the stabilizing means described. The fuel flow to ram-jets units will have been discontinued when aircraft speed is reduced. Landing may then proceed, as described.

The valve means designated as 14 is only one type of valve means which may be used in any construction for the purpose which is described, and in some constructions other forms of valve means may better serve the objectives as have been described. I have shown the main turbines and discharge jets as being of the turbine jet form but the use of air-fans with such means is well known and such air fans may be used in connection with the main turbines and their jet discharges.

It is important to note that in the transition from one form of sustentation to the other, that is from sustentation secured wholly or in part from the downwardly directed air discharges to sustentation secured wholly or in part from the flow of ambient air adjacent to the air foil surfaces (sustentation surfaces), travel speed may be secured from use of one of the main turbine jets for translational propulsion, while the others are used for sustentation propulsion, and the valve means described or any other valve means may be used to accomplish such functioning.

While I have shown particular devices and combinations of devices in the illustration of my invention, I contemplate and intend that other detailed devices and combinations of devices may be used in the realization of my invention, without departing from the spirit and contemplation thereof.

What I claim is:

1. In an aircraft: a fuselage structure, a sustentation surface structure arranged to provide sustentation in translational flight by its angular disposition relative to translational flight of the aircraft; a propulsion system to provide thrust for translational flight; a plural number of air channels, each having means for air intake, each having an air discharge directed downwardly of the translational flight direction, each having shutter means at its said air discharge, each said shutter means having alternative location, in one location forming a closure for said air discharge associated with it each closure forming relatively a continuation of said sustentation surface structure, and in an alternative location being placed to open said air discharge associated for flow of air; each said air channel having air propellor means located therein between said air intake and the associated air discharge, each air propellor means having interconnected therewith means to rotationally drive the air propellor means, the said last named means to rotationally drive including inter-connecting conduit means between the said propulsion system and turbine means inter-connected with the air propellor means for transmission of exhaust gases from said propulsion system to said turbine means the said propulsion system to provide thrust for translational flight including a combustion turbine inducting air from ambient air and supplied with fuel to produce jet propulsion translationally, the said propulsion system including also an alternative jet propulsion system having ram-jet air intake, ram-jet combustion chamber and fuel supply thereto and jet discharge directed rearwardly of the direction of translational flight; and means to prevent air flow into said first named propulsion system when there is combustion induced flight propulsion by said alternative propulsion system.

2. The device as defined in claim 1 and: means gyroscopically controlled to affect at least one of said air propellor means to relatively increase or diminish air flow in an air channel.

3. The device as defined in claim 1 and: the associated means for each air propellor means driving the air propellor means being a fluid driven turbine interconnected drivably with the air propellor means, pressurized fluid supply to each said turbine, valve means in each said pressurized fluid supply, each valve means including a passage for constant limited flow, each valve means including supplementary passage means and a valve means to modify flow through the supplementary passage means and electro-magnetically operated means actuating the individual valve means, and control means for the electro-magnetically operated means.

4. In an aircraft: a fuselage structure means, a sustentation surface structure arranged to provide sustentation in translational flight by its angular disposition relatively to translational flight of the aircraft; a propulsion system to provide thrust for translational flight; an air propulsion means arranged in one such structure in an air channel having an air discharge directed downwardly of the translational flight direction and having inter-connected therewith a means by which rotational driving torque is given to the air propulsion means; the said propulsion system including a combustion turbine having air compressor means with air intake, combustion chamber and means supplying fuel thereto, turbine and exhaust chamber receiving gases from the turbine and jet discharge to discharge exhaust gases to ambient air rearwardly of translational flight; said air propulsion means including a sustentation turbine and an air propellor means driven by the sustentation turbine and arranged in said air channel, air intake to said air channel, an inter-connection between said combustion turbine and sustentation turbine for flow of gaseous fluid exhausting from said combustion turbine, means arranged in said inter-connection to control flow therethrough for increase or diminishment of flow therethrough, and: a plural number of satellite stabilizing air propulsion units each unit comprised of air propellor means, gaseous fluid driven turbine interconnected to drive the air propellor means, air channel means having air induction from upwardly of the aircraft and air expulsion means downwardly of the aircraft, and a control means and fluid conduit means providing for flow of fluid from said air compressor means and to each of said air propulsion units for driving its gaseous fluid driven turbine, means supplying fluid fuel to each said gaseous fluid driven turbine of said units for combustion with pressurized air flowing thereto, and inertia controlled means to increase or diminish fuel flow to anyone of said units according to the inertia directed control for increase or diminishment of combustion heating of the air flow to an associated gaseous fluid driven turbine.

References Cited by the Examiner

UNITED STATES PATENTS

| | | | |
|---|---|---|---|
| 1,763,454 | 6/1930 | Berry | 244—6 |
| 2,501,078 | 3/1950 | Newcomb | 244—15 |
| 2,848,181 | 8/1958 | Landers | 244—58 |
| 2,870,978 | 1/1959 | Griffith | 244—23 |
| 3,056,565 | 10/1962 | Griffith | 244—12 |
| 3,080,137 | 3/1963 | Hurel | 244—12 |

FOREIGN PATENTS

| | | |
|---|---|---|
| 712,682 | 7/1954 | Great Britain. |
| 846,300 | 8/1960 | Great Britain. |

MILTON BUCHLER, *Primary Examiner.*

R. DAVID BLAKESLEE, *Examiner.*

L. C. HALL, *Assistant Examiner.*